H. H. SUPLEE.
SLIDE VALVE FOR INTERNAL COMBUSTION ENGINES.
APPLICATION FILED FEB. 16, 1914.
1,234,411.
Patented July 24, 1917.
2 SHEETS—SHEET 1.
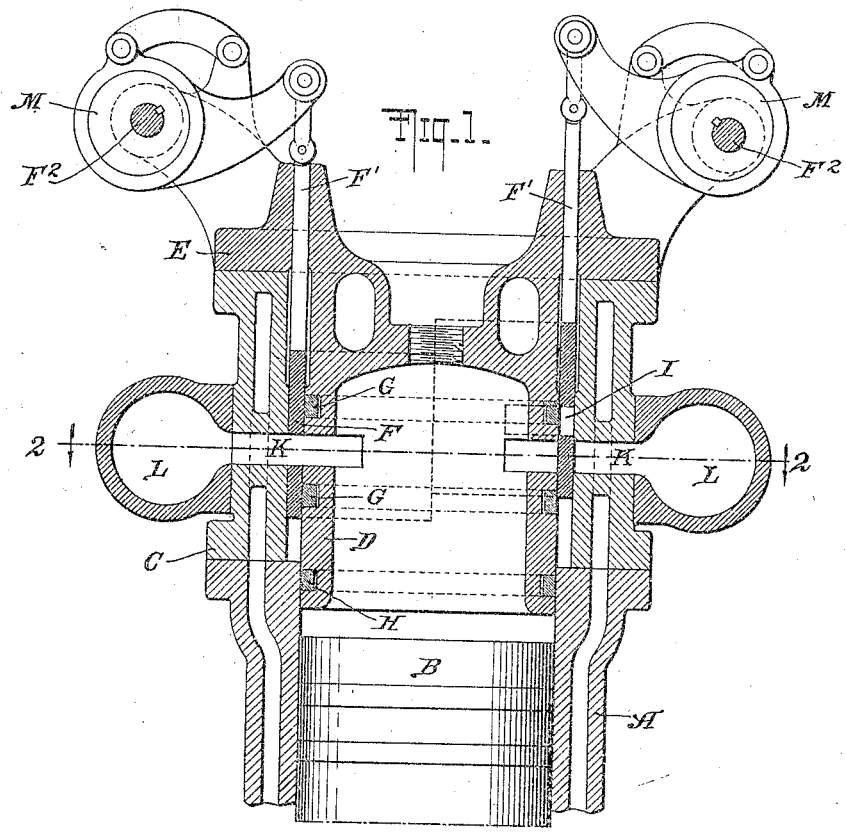
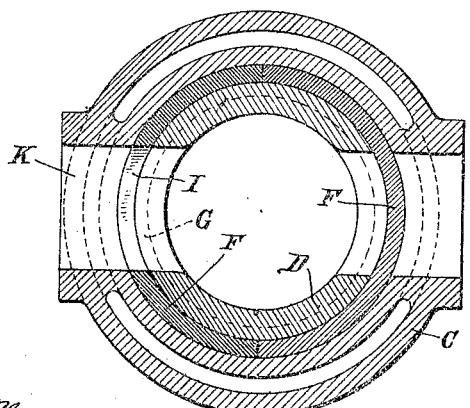
WITNESSES
INVENTOR
HENRY H. SUPLEE
BY
ATTORNEYS H. H. SUPLEE.
SLIDE VALVE FOR INTERNAL COMBUSTION ENGINES.
APPLICATION FILED FEB. 16, 1914.
1,234,411.
Patented July 24, 1917.
2 SHEETS—SHEET 2.
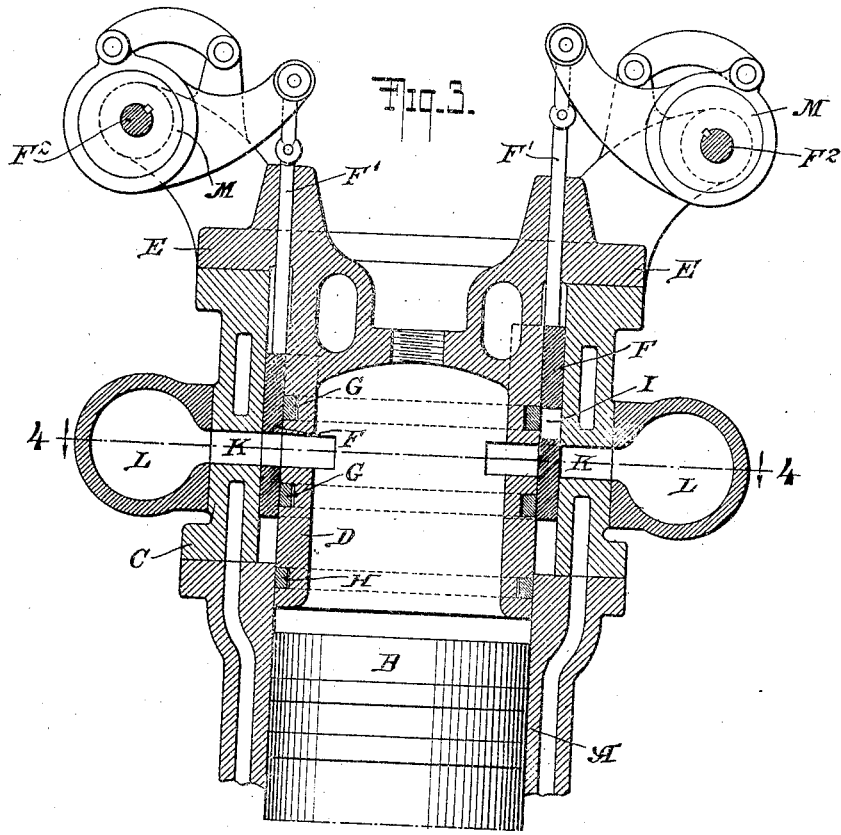
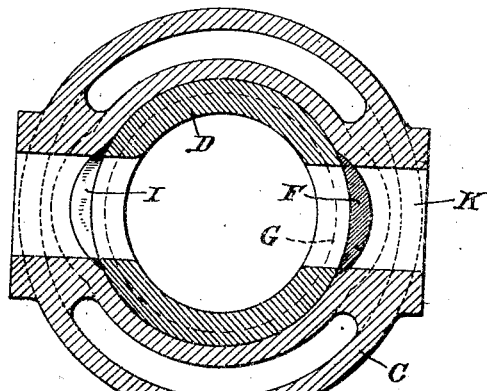
WITNESSES
George Du Bois
Edwin S... Young
INVENTOR
HENRY H. SUPLEE
BY
Briesen & Knauth
ATTORNEYS

UNITED STATES PATENT OFFICE.

HENRY HARRISON SUPLEE, OF NEW YORK, N. Y., ASSIGNOR, BY MESNE ASSIGNMENTS, TO JOHN T. PRATT, OF NEW YORK, N. Y.

SLIDE-VALVE FOR INTERNAL-COMBUSTION ENGINES.

1,234,411. Specification of Letters Patent. Patented July 24, 1917.

Application filed February 16, 1914. Serial No. 818,865.

*To all whom it may concern:*

Be it known that I, HENRY HARRISON SUPLEE, a citizen of the United States, and a resident of the city, county, and State of New York, have invented a certain new and useful Improvement in Slide-Valves for Internal-Combustion Engines, of which the following is a specification.

My invention relates especially to the valves and valve gear of internal combustion engines and is more particularly concerned with such valves when they are of what is known as the sliding type with movement parallel to that of the piston.

My invention has for its object to provide a construction and location for slide valves of the type specified such that the friction of the valves shall be lessened upon and wear of the valves shall be lessened and so that the effort required to operate them shall be uniform and small. A further object of my invention is to so construct and locate these slide valves that they shall be relatively small and hence have their entire mass in a region in which the temperature changes take place with substantial uniformity in the entire valve. Still another object of my invention is to so construct and locate the slide valves as to prevent their buckling or warping under the changes of temperature to which they are subjected, whereby engines of the referred to slide valve type often tend to work irregularly and inefficiently or perhaps are stopped altogether by excessive friction.

Another object of my invention is to so locate the valves and valve gear with relation to the cylinder that they constitute a complete unitary mechanism which may be attached and detached at will for purposes of repair or replacement. This unitary mechanism may be manufactured as a piece distinct from the rest of the engine to standard dimensions. This is very desirable because the valves and valve gear require to be made and fitted with great accuracy by workmen of the highest skill. The construction of valves and valve gear as above described confines the portion requiring the higher type of work to a limited portion of the machine, and enables the remainder of the work to be performed by workmen of lesser skill. The handling of the work and consequent inadvertent injury thereto is lessened and the manufacturing process cheapened and made more expeditious and systematic.

In the accompanying drawings I have shown my invention as applied to an engine of the general type illustrated in the patent to Mustad No. 974,809, November 8, 1910. In said patent there is disclosed a valve structure comprising a pair of semi-tubular segments fitted within the cylinder casing between said casing and the piston and provided with a suitable gear at the crank end by means of which the valves are independently operated to suitably open and close the ports. I also show in my drawings, my invention applied to another construction of slide valve engine in which the valves, instead of being semi-annular, subtend a comparatively small angle, are of crescent shaped section, and are recessed in the cylinder between the piston and the cylinder wall or casing.

In valves of either the Mustad type or of the other type just referred to, only a small portion of the length of the valve has any real function as a valve, the remaining length constituting merely a connecting bar reaching down the cylinder to the valve operating gear. Since the entire length of the valve over the entire stroke of the piston must be perfectly finished and fitted in order that the piston may work smoothly without unnecessary friction and without leakage, it is clear that the construction of such valves is somewhat expensive. This is particularly true of the crescent sectioned valves referred to above because the valve subtends only a small portion of the complete cylinder which must, therefore, first be suitably recessed to accurately receive the valves and then be cylindrically bored to receive the piston.

These long valves also suffer from the disadvantage that, being curved and having one side subjected to the high temperature of the expansion chamber while the other side is subjected to the much lower temperature of the cooled walls, there is danger that in operation the valves will warp or twist slightly, therefore binding and producing excessive friction and wear and sometimes stopping the engine altogether. This difficulty is accentuated by the fact that the inner side of the valve is not subjected to uniform temperature over its whole area since the greatest heat is, of course, concentrated at the explosion point near one end of the cylinder and falls off greatly toward the other end. In the case of the crescent sectioned valve the disadvantages are doubly accentuated by reason of the peculiar section, which is quite thick in the middle and tapers off to a thin edge on each side.

The disadvantages above enumerated are avoided by my present invention which will be better understood by referring to the drawings in which Figure 1 represents a central axial section through part of a cylinder and embodying my invention as applied to a slide valve of semi-annular type; Fig. 2 represents a sectional view taken along the line 2—2 of Fig. 1; Fig. 3 represents a view, similar to Fig. 1, but showing my invention applied to valves of the crescent sectioned type; and Fig. 4 represents a sectional view along the line 4—4 of Fig. 3.

Referring to the drawings, the main cylinder, A, is provided with a piston, B, which is connected in the usual manner to a suitable crank; the details of this connection are not shown as they have nothing to do with the present invention. Instead of the usual plain cylinder end, the cylinder, A, is surmounted by an auxiliary cylinder, C, within which is fitted the cylinder head, D, provided with a flange, E, adapted to be bolted to the end of the main cylinder, A. The cylinder head, D, is sufficiently long to be inserted for a short distance into the main cylinder, A, and is accurately turned to fit therein. The internal portion of the auxiliary cylinder, C, is greater than the diameter of the cylinder head, D, and main cylinder, A, thus providing an annular space in which are located the semi-annular valves, F, each of which subtends an angle of 180° and is carefully turned to a uniform thickness so as to fit easily within said annular space.

The cylinder head D is provided with expanding packing rings, G, G, of usual type which press firmly against the valves, F, F, and force them against the interior of the auxiliary cylinder so as to maintain tight working joints. An additional packing ring, H, at the bottom of head, D, and below the top of main cylinder, A, insures tight joints at the top of said cylinder.

The valves, F, F, are provided with ports or openings, I, by means of which, when the valves are moved up and down in the annular spaces provided for them, communication will be established or cut off between the inlet and exhaust manifolds, L, L, and the interior of the cylinder. Each valve, F, is connected, by a rod F' passing up through the top of the cylinder head, with a cam M operated by cam shaft F², itself suitably connected by gears, chain drive or the equivalent, to the crank in the usual manner.

In the modification shown in Figs. 3 and 4, the construction is exactly the same except that crescent sectioned valves instead of semi-tubular valves are used. The auxiliary cylinder, C, is, therefore, provided with crescent sectioned recesses in its interior wall to receive the two valves, the remaining portion of its wall being annular and dimensioned to receive the auxiliary cylinder head, D. The valves, F, F, are, as in the form shown in Figs. 1 and 2, connected by rods, F', to the valve gear.

It will be seen from the above description that, by constructing and locating the valves as in the present invention, the main cylinder may be bored out to a true cylinder in the usual way and may have the usual cooling arrangements applied to its walls. The valves themselves are made much shorter than where they are placed in the cylinder proper and are, as a whole, so small that they do not at any time extend out of a region throughout the whole of which the temperature is substantially uniform. By thus making the valves small and locating them in the particular position shown they are less liable to warp and twist.

It will also be seen that, by arranging the valve gear and valves at the outer end of the cylinder instead of at the crank end, they are made much more accessible in case of repairs or replacements.

It may be further seen that, according to my invention, the valves, valve gear, cylinder head and auxiliary cylinder are combined into a single structural entity of simple and compact form, which may be manufactured separately from the rest of the engine to standard dimensions, so as to be interchangeable in all engines. In case of breakage or wear which must be quickly made good, it is, therefore, not necessary to take out any individual part but the entire combined auxiliary cylinder, cylinder head, valves and valve gear may be removed as a whole and replaced by another.

While I have described my invention as applied to particular forms of sliding valves and valve gear, I do not intend the scope of the claim which follows to be limited thereto, since it is obvious that my invention may be applied to and embodied in many various forms of valve and valve gear.

Having described my invention I claim:

In an internal combustion engine, in combination with a main cylinder, an independent unitary mechanism adapted to be bolted to the end of said cylinder comprising an auxiliary cylinder and an inner concentric cylinder head having spaces between them, the auxiliary cylinder having separate ports opening into inlet and exhaust manifolds and the concentric cylinder head having separate ports opening into the explosion chamber, independent axially slidable valves in said spaces and lying axially entirely beyond the end of the main cylinder each having a port adapted to coöperate with a port of the auxiliary cylinder and of the head, and means attached to and removable with said independent unitary mechanism for operating said valves.

In testimony whereof I have hereunto set my hand in the presence of two subscribing witnesses.

HENRY HARRISON SUPLEE.

Witnesses:
ELMER GLOITHYOUNG,
FRED. A. KLEIN.